United States Patent
Akula et al.

(10) Patent No.: US 12,386,799 B1
(45) Date of Patent: Aug. 12, 2025

(54) LLM-GRAPH-OF-THOUGHTS LEVERAGING UNIFIED DATA ACCESS ACROSS DIVERSE GRAPHQL APIS

(71) Applicant: Bank of America Corporation, Charlotte, NC (US)

(72) Inventors: Murali Krishna Akula, Hyderabad Telangana (IN); Uttam Dey, Charlotte, NC (US); Durga Prasad Kutthumolu, Hyderabad Telangana (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/748,241

(22) Filed: Jun. 20, 2024

(51) Int. Cl.
  *G06F 16/215* (2019.01)
  *G06F 16/2452* (2019.01)

(52) U.S. Cl.
  CPC ...... *G06F 16/215* (2019.01); *G06F 16/24522* (2019.01)

(58) Field of Classification Search
  CPC .................. G06F 16/215; G06F 16/24522
  See application file for complete search history.

(56) References Cited

U.S. PATENT DOCUMENTS

| | | | |
|---|---|---|---|
| 11,381,601 | B2 | 7/2022 | Prakash et al. |
| 2023/0289339 | A1 | 9/2023 | Sagar |
| 2024/0362212 | A1* | 10/2024 | Sun .................. G06F 16/24522 |

OTHER PUBLICATIONS

Li, Y., Graph-of-Thought: Utilizing Large Language Models to Solve Complex and Dynamic Business Problems, Advances in Artificial Intelligence and Machine Learning; Research 4 (1) 2077-2090 Accepted Mar. 14, 2024; Published Mar. 21, 2024. (Year: 2024).*
Besta et al. Proceedings of the Thirty-Eighth AAAI Conference on Artificial Intelligence and Thirty-Sixth Conference on Innovative Applications of Artificial Intelligence and Fourteenth Symposium on Educational Advances in Artificial Intelligence Article No. 1972, pp. 7682-17690, Feb. 2024 (Year: 2024).*
Ganesan et al., LLM-powered GraphQL Generator for Data Retrieval, Proceedings of the Thirty-Third International Joint Conference on Artificial Intelligence (IJCAI-24), pp. 8657-8660 (Year: 2024).*
Sun et al. Think-on-Graph: Deep and Responsible Reasoning of Large Language Model on Knowledge Graph, ICLR 2024, pp. 1-31 (Year: 2024).*

* cited by examiner

*Primary Examiner* — Cheyne D Ly
(74) *Attorney, Agent, or Firm* — Weiss & Arons LLP

(57) ABSTRACT

Methods and systems for synergistic use of a large language model ("LLM") and Graph-of-Thoughts ("GoT") for unified data access across GraphQL application protocol interfaces ("APIs") via a single API. Methods and systems may include requesting to identify and retrieve data concerning GraphQL APIs from a GraphQL API schema hub. Methods and systems may include identifying key relationships between data elements in the GraphQL APIs using relationship semantic analysis and transporting a text prompt via a cache to an LLM-GOT synergistic processor. Methods and systems may include modeling information generated by the LLM-GoT synergistic processor as an arbitrary graph, generating a unified GraphQL API based on synergistic outcomes, and storing the unified GraphQL API in the GraphQL API schema hub.

20 Claims, 6 Drawing Sheets

LLM-GRAPH-OF-THOUGHTS LEVERAGING UNIFIED DATA ACCESS ACROSS DIVERSE GRAPHQL APIS

FIELD OF TECHNOLOGY

Aspects of the disclosure relate to the synergistic use of a large language model ("LLM") and Graph-of-Thoughts ("GoT") for unified data access across Graph Query Language ("GraphQL") application programming interfaces ("APIs") via a single API.

BACKGROUND OF THE DISCLOSURE

The Financial Data Exchange ("FDX") is an international, nonprofit organization operating in the US and Canada. The FDX defines Open Banking APIs. Open Banking is a financial services model that allows third-party developers to access financial data in traditional banking systems through APIs.

Financial institutions share financial data and services with authorized third parties (e.g., "aggregators") through open APIs (after obtaining consent from customers).

Many current industry challenges exist. First, frequent FDX API changes are challenging to handle. Current systems are unequipped to deal with real-time changes in response to payload structure, as well as addition and removal of data fields, requiring modifications in aggregator APIs, and implementing these changes for various aggregators and multiple APIs.

Second, testing and integration remain a challenge. Testing and integration involve significant effort in modifying APIs. Because each API is tested and integrated separately, API testing and integration remain costly and time-consuming processes.

Third, security is a challenge. In the banking and finance industry, data security is paramount. Implementing open API solutions while maintaining strict data privacy and confidentiality requirements presents a challenge. And protecting sensitive customer information and transaction data is essential.

Fourth, scalability is also challenging. As banking and finance systems grow in complexity and scale, distributed tracing processes face an increasing volume of transactions and services. Thus, scaling distributed tracing to accommodate such growth while maintaining performance and accuracy is a significant challenge.

Sagar et al., U.S. Pat. Pub. No. 2023/0289339 and Prakash et al., U.S. Pat. No. 11,381,601 disclose methods for maintaining a schema hub in a database based on specific policies.

It would therefore be desirable to develop methods and systems for providing a synergistic use of a large language model and Graph-of-Thoughts ("LLM-GoT") for unified data access across GraphQL APIs via a single, unified API.

SUMMARY OF THE DISCLOSURE

Methods and systems for synergistic use of an LLM-GOT for unified data access via a single API across GraphQL APIs are provided.

GraphQL is an open-source data query language ("QL") software. GraphQL provides querying capabilities to retrieve data as graphs. GraphQL is a manipulation language for APIs and a query runtime engine. GraphQL may enable declarative data fetching where a client can specify exactly what data is needed from an API.

Instead of multiple endpoints that return separate data, a GraphQL server may expose a single endpoint and may respond with precisely the data a client asked for. Because a GraphQL server may fetch data from separate sources and present the data in a unified graph, it may not be connected to any specific database or storage engine.

Currently, there exists only one option for queries-a user may log into a financial institution online portal. Open Banking channels provide inbound requests. But these inbound requests conform to standards. And these standards change-Open APIs change.

A GraphQL layer may provide different layers-a single API with a GoT layer for data providers. The GraphQL layer may function as an aggregator of APIs.

The methods and systems may also provide an LLM-driven model providing a consistent set of APIs to third party recipients. If standards change, the systems and methods may automatically review and revise queries in real time to conform with the new standards. The methods and systems may provide a proper API for a given situation using generative AI. The methods and systems may provide for scalability via a schema hub and storing past data. The methods and systems may reduce the need for a quantity of API developers.

The methods and systems may operate local traffic management ("LTM") to control data traffic into and out of a synergistic engine ("Syner Engine"). The first layer of the Syner Engine may employ a relationship semantic analysis (run by AI and a natural language processor ("NLP")). If the Syner Engine is lacking data, it may obtain the necessary data from a schema hub.

Thus, methods and systems may provide a fully loaded mechanism before injecting an API. A cache may carry all API details. A prompt may provide a GoT. The GoT may be represented by nodes. Each of the nodes may represent an investment or domain.

The LLM may interconnect the APIs and nodes. For example, given an incoming request, the methods and systems may determine how to respond based on the Syner Engine-LLM, GOT, and AI.

If an inbound request for information or query changes, the methods and systems may be able to find the missing query or information. The methods and systems may function to determine how to respond to such changes. The methods and systems may allow less need for developers because developers could take a universal API and implement it to handle such changes automatically.

For example, if a query requires another piece of information, e.g., a zip code, a uniform API may modify the query accordingly. The uniform API may reach out to its own database and change a zip code to a correct formatting. The GraphQL layer may use generative AI to semantically create a GOT to determine any relationships that exist between data. The synergy between the GoT, AI, and LLM, may enable a uniform API that could instantly handle any query changes.

Provided herein are systems and methods for generating new GraphQL APIs dynamically based on an initial interaction with a developer request. A developer may request a query for an API creation. For example, a developer may request a written initial skeleton part of a query required by a GraphQL API (e.g., a query for metadata). The developer may then inject the query into a unified API engine. The unified API engine may determine which GraphQL APIs are required to be created for a cluster of business functions. The unified API engine may then grant singular access to a downstream system by leveraging auto-prompt engineering and LLM-GOT methods.

Systems and methods may employ a GoT-powered platform to provide a consistent API for accessing GraphQL APIs from diverse sources using a relational similarity technique. The methods and systems provided herein offer a single API from which developers may obtain data for all GraphQL APIs required. This may enable easier and more efficient development of applications consuming data from many GraphQL APIs.

To detect comparable data points across different GraphQL APIs, the methods and systems may employ a relational similarity technique. Using this relational similarity technique, the methods and systems may be able to provide a uniform API that developers could use to access data from numerous GraphQL APIs. Machine learning ("ML") techniques may also be used by the methods and systems to find trends in the data and deliver insights that can be used to make informed decisions.

Methods and systems may provide at least the following features:

1. Democratizing Open Banking data access through a unified GraphQL schema. And enabling developers to build innovative financial applications without grappling with complex API complexities.

2. Leveraging advanced schema analysis techniques to automatically identify and group related fields across multiple Open Banking APIs, and thus simplifying data retrieval and analysis.

3. Empowering developers with self-service tools to manage API keys, access documentation, and receive support, streamlining the development process, and fostering a self-sufficient developer ecosystem.

4. Accelerating application development by providing pre-built graphs of thought for common financial tasks, eliminating the need for developers to manually construct these complex knowledge structures.

5. Unleashing developer creativity by enabling developers to create and share their own graphs of thought, promoting innovation and the development of unique financial solutions.

6. Fostering a vibrant developer community through a dedicated marketplace for graphs of thought, facilitating knowledge exchange and the adoption of best practices.

7. Cultivating a collaborative learning environment by providing a community forum for developers to discuss graphs of thought and Open Banking, fostering peer-to-peer learning and collective problem-solving.

8. Transcending traditional API limitations by utilizing GraphQL's expressive and flexible schema, enabling developers to construct complex data queries with ease.

9. Revolutionizing financial data accessibility by providing a unified GraphQL schema that aggregates data from diverse Open Banking APIs, removing data silos and streamlining data access.

10. Enabling seamless integration of financial data into applications by providing readily available software development kits ("SDKs") for various programming languages, catering to a diverse developer community.

11. Empowering developers to create personalized financial experiences by leveraging graphs of thought to tailor applications to specific user needs and preferences.

12. Accelerating financial innovation by providing a comprehensive platform that encompasses API registration, schema analysis, schema unification, SDK generation, self-service tools, pre-built graphs, community forums, and a graph marketplace.

Methods and systems may include using a synergistic graph unified creative processor. The synergistic graph unified creative processor may target various GraphQL APIs. The GraphQL APIs may be component specific. The GraphQL APIs may function as microservices supporting finance channels.

Methods and systems may work based on an incoming initial graph query request to automate a generative artificial intelligence ("AI") prompt generation to rebuild a diversified and enhanced unified GraphQL API in a GoT context.

Methods and systems may provide at least the following improvements over other references. First, methods and systems may generate new GraphQL APIs dynamically using an LLM. Second, methods and systems may provide accurate data fetching-neither over-fetching nor under-fetching data. Third, methods and systems may enable an application API to evolve without breaking or destroying existing APIs.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
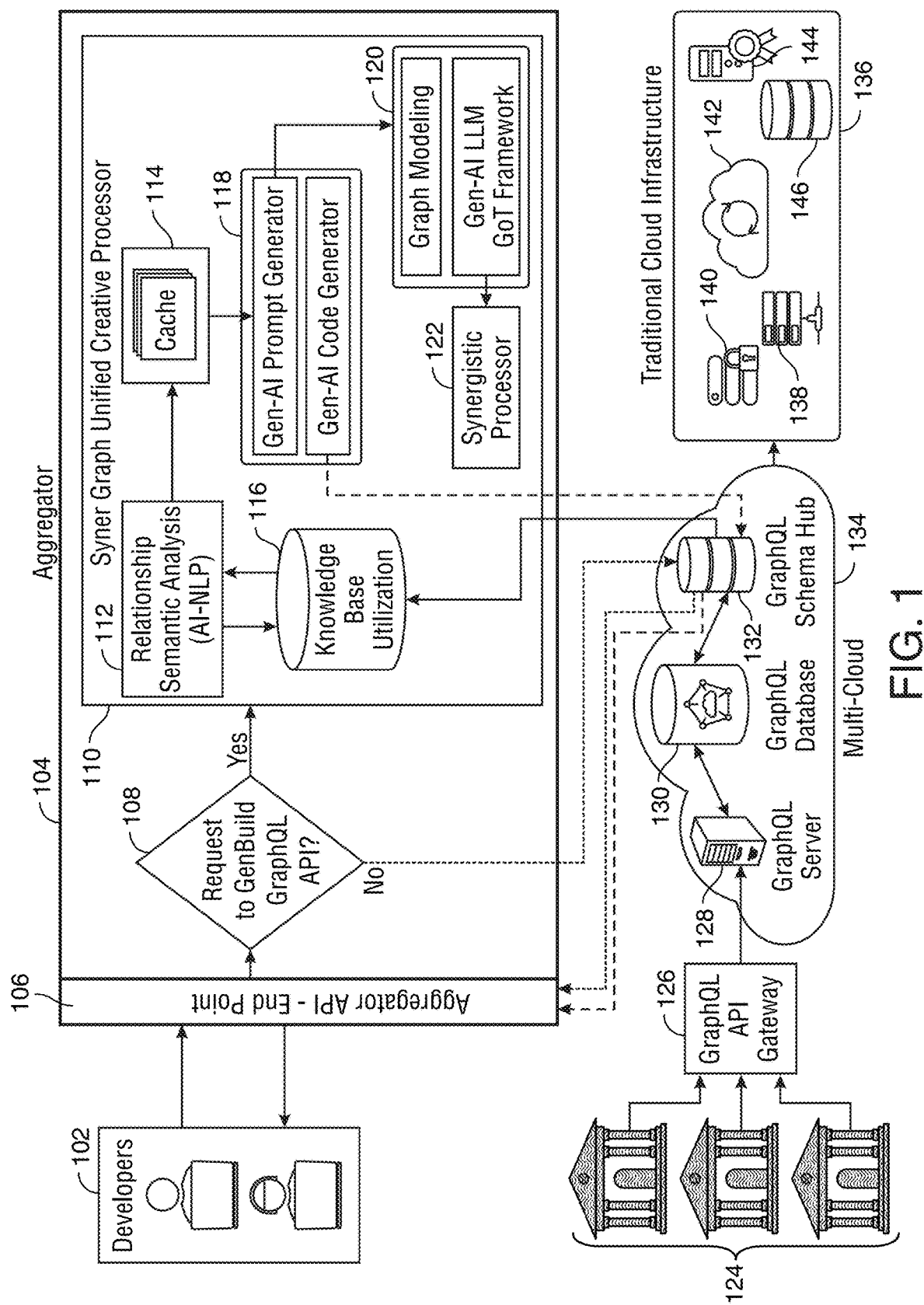
FIG. 1 shows a schematic diagram of the methods and systems in accordance with principles of the disclosure.

Systems and methods are provided to perform multi-cloud synergistic GraphQL generative AI that eliminates a need for manual editing of queries. The systems may include a computer program product comprising executable instructions that function when executed by a processor on a computer system.

The systems may include receiving a request from an Open Banking API to identify GraphQL APIs. The systems may include retrieving data concerning the GraphQL APIs from a GraphQL API schema hub.

The systems may include transmitting a response to the Open Banking API concerning an accessibility of the GraphQL APIs. The systems may include, after the transmitting, receiving a request to generate and build a unified GraphQL API based on the retrieved GraphQL APIs.

The systems may include, in response to receiving the request, building the unified GraphQL API. The systems may include searching the Open Banking API to identify data, stored on the Open Banking API, that concerns GraphQL APIs.

The systems may include retrieving, from the GraphQL API schema hub, Open Banking and GraphQL API schemas related to the GraphQL APIs. The systems may include using relationship semantic analysis to identify key relationships between data elements in the GraphQL APIs.

The systems may include, based on the key relationships, forming a unified GraphQL API prompt by generating a text prompt. The systems may include transporting the text prompt via a cache to an LLM-GoT synergistic processor. The LLM-GOT synergistic processor may generate information concerning the GraphQL APIs. The information concerning the GraphQL APIs generated by the LLM-GOT synergistic processor may include LLM thoughts.

The LLM thoughts may concern relationships between account information and transaction history. The LLM thoughts may be represented by a GoT. The LLM thoughts may be represented by an arbitrary graph of nodes. The arbitrary graph of nodes and GoT may include vertices and edges between vertices. Units of the information concerning the GraphQL APIs may be vertices, and edges may be dependencies between the vertices. The systems may include modeling the information concerning the GraphQL APIs generated by the LLM-GoT synergistic processor as an arbitrary graph of nodes that includes connections between the key relationships.

The systems may include distilling networks of the LLM thoughts. The systems may include enhancing the LLM thoughts using feedback loops. The systems may include, after the distilling and the enhancing, modeling the LLM thoughts, using the arbitrary graph of nodes, into synergistic outcomes. The systems may include combining, via the LLM-GOT synergistic processor, distilling networks of the LLM thoughts, enhancing the LLM thoughts using feedback loops, and, after the distilling and the enhancing, modeling the LLM thoughts, using the arbitrary graph of nodes, into synergistic outcomes.

The systems may include generating a unified GraphQL API based on the synergistic outcomes. The systems may include storing the unified GraphQL API in the GraphQL API schema hub. The systems may include receiving, from a user interface ("UI"), a query. The systems may include feeding the query to the unified GraphQL API.

The systems may include receiving, from the unified GraphQL API, instructions to edit the query. The systems may include executing the instructions to edit the query, eliminating a need to manually edit the query.

The systems may include the GraphQL API schema hub connected to a GraphQL database and a GraphQL server in a multi-cloud. The systems may include the GraphQL API schema hub connected to financial institutions via the GraphQL server, the GraphQL server being a GraphQL API gateway.

The systems may include a text prompt in JavaScript Object Notation ("JSON") format. The systems may include key relationships including a relationship not explicitly defined in the GraphQL APIs. The systems may include key relationships including a relationship between a financial account number and a routing number.

The systems may include the GraphQL APIs subjected to local traffic management. The systems may include a unified GraphQL API including a zip code. The systems may include the unified GraphQL API replacing the GraphQL APIs. The systems may include eliminating a need to manually edit the query including reducing a quantity of API developers required.

Methods for performing multi-cloud synergistic GraphQL generative AI eliminating a need for manual editing of queries are provided. The methods may include receiving a request from an Open Banking API to identify GraphQL APIs.

The methods may include retrieving data concerning the GraphQL APIs from a GraphQL API schema hub. The methods may include transmitting a response to the Open Banking API concerning an accessibility of the GraphQL APIs. The methods may include, after the transmitting, receiving a request to generate and build a unified GraphQL API based on the retrieved GraphQL APIs.

The methods may include, in response to receiving the request, building the unified GraphQL API. The methods may include searching the Open Banking API to identify data, stored on the Open Banking API, that concerns GraphQL APIs.

The methods may include retrieving, from the GraphQL API schema hub, Open Banking and GraphQL API schemas related to the GraphQL APIs. The methods may include using relationship semantic analysis to identify key relationships between data elements in the GraphQL APIs.

The methods may include, based on the key relationships, forming a unified GraphQL API prompt by generating a text prompt. The methods may include transporting the text prompt via a cache to an LLM-GOT synergistic processor. The LLM-GOT synergistic processor may generate information concerning the GraphQL APIs. The information concerning the GraphQL APIs generated by the LLM-GOT synergistic processor may include LLM thoughts.

The LLM thoughts may concern relationships between account information and transaction history. The LLM thoughts may be represented by a GoT. The LLM thoughts may be represented by an arbitrary graph of nodes. The arbitrary graph of nodes and GoT may include vertices and edges between vertices. Units of the information concerning the GraphQL APIs may be vertices, and edges may be dependencies between the vertices. The methods may include modeling the information concerning the GraphQL APIs generated by the LLM-GOT synergistic processor as an arbitrary graph of nodes that includes connections between the key relationships.

The methods may include distilling networks of the LLM thoughts. The methods may include enhancing the LLM thoughts using feedback loops. The methods may include, after the distilling and the enhancing, modeling the LLM thoughts, using the arbitrary graph of nodes, into synergistic outcomes. The methods may include combining, via the LLM-GOT synergistic processor, distilling networks of the LLM thoughts, enhancing the LLM thoughts using feedback loops, and, after the distilling and the enhancing, modeling the LLM thoughts, using the arbitrary graph of nodes, into synergistic outcomes.

The methods may include generating the unified GraphQL API based on the synergistic outcomes. The methods may include storing the unified GraphQL API in the GraphQL API schema hub. The methods may include receiving, from a UI, a query. The methods may include feeding the query to the unified GraphQL API.

The methods may include receiving, from the unified GraphQL API, instructions to edit the query. The methods may include executing the instructions to edit the query, eliminating a need to manually edit the query.

The methods may include the GraphQL API schema hub connected to a GraphQL database and a GraphQL server in a multi-cloud. The methods may include the GraphQL API schema hub connected to financial institutions via the GraphQL server, the GraphQL server being a GraphQL API gateway.

The methods may include a text prompt in JSON format. The methods may include key relationships including a relationship not explicitly defined in the GraphQL APIs. The methods may include key relationships including a relationship between a financial account number and a routing number.

The methods may include the GraphQL APIs subjected to local traffic management. The methods may include a unified GraphQL API including a zip code. The methods may include the unified GraphQL API replacing the GraphQL APIs. The methods may include eliminating a need to manually edit the query. The methods may include reducing a quantity of API developers required.

The steps of illustrative methods may be performed in an order other than the order shown or described herein. Some embodiments may omit steps shown or described in connection with the illustrative methods. Some embodiments may include steps that are neither shown nor described in connection with the illustrative methods. Illustrative method steps may be combined. For example, one illustrative method may include steps shown in connection with another illustrative method.

Some embodiments may omit features shown or described in connection with the illustrative systems. Some embodiments may include features that are neither shown nor described in connection with the illustrative systems. Features of illustrative systems may be combined. For example, one illustrative embodiment may include features shown in connection with another illustrative embodiment.

Embodiments may involve some or all of the features of the illustrative systems or some or all of the steps of the illustrative methods.

The illustrative apparatus, systems, and methods will now be described with reference to the accompanying Figures, which form a part hereof. It is to be understood that other embodiments may be utilized, and that structural, functional, and procedural modifications may be made without departing from the scope and spirit of the present disclosure.

FIG. 1 shows a schematic diagram of the methods and systems in accordance with the principles of the disclosure. Developers 102 may develop APIs. The APIs may include GraphQL APIs. The APIs may be passed through an Aggregator API-End Point 106. The Aggregator API-End Point 106 may aggregate APIs and pass them through an API Aggregator 104.

Aggregator 104 may include a next step, 108, of requesting to generatively build ("GenBuild") a GraphQL API. If the request to GenBuild is answered "No," then the systems may pull a GraphQL API from a GraphQL Schema Hub 132 within a Multi-Cloud 134. Otherwise, if the request to GenBuild is answered "Yes," the Aggregator 104 may include a next step, 112, a Relationship Semantic Analysis (AI-NLP) within a Syner Graph Unified Creative Processor 110.

The Relationship Semantic Analysis (AI-NLP)) 112 may look for key relationships between data within the GraphQL APIs. The Relationship Semantic Analysis (AI-NLP) 112 may be in bidirectional communication with a Knowledge Base Utilization 116. The Relationship Semantic Analysis (AI-NLP) 112 may send information concerning the GraphQL APIs to a Cache 114.

The information concerning the GraphQL APIs from the Relationship Semantic Analysis (AI-NLP) 112 may be sent from the Cache 114 to a generative AI ("Gen-AI") prompt generator 118, which may generate text prompts. The Gen-AI prompt generator 118 may include a Gen-AI code generator, which may generate prompt codes. The Gen-AI prompt generator 118 may send text prompts and prompt codes to the GraphQL Schema Hub 132 within the Multi-Cloud 134.

The Gen-AI Prompt Generator 118 may send text prompts and prompt codes to a Graph Modeling 120. Graph Modeling 120 may include a Gen-AI LLM GOT Framework that enables synergistic creation and analysis of an arbitrary graph. The arbitrary graph may include nodes, vertices, and edges, and may generate information based on key relationships between data. The information based on key relationships between data may be processed in a Synergistic Processor 122.

Knowledge Base Utilization 116 may receive information from the GraphQL Schema Hub 122. The GraphQL Schema Hub 122 may send information to the Aggregator API-End Point 106 and a Traditional Cloud Infrastructure 136. Traditional Cloud Infrastructure 136 may include traditional cloud architecture-data segments 138, data lock 140, data refresh 142, data security 144, and data storage 146. The GraphQL Schema Hub 122 may communicate with a GraphQL Database 130. The GraphQL Database 130 may communicate with GraphQL Server 128. The GraphQL Database 130, the GraphQL Server 128, and the GraphQL Schema Hub 134 may be included within the multi-cloud 134.

The GraphQL Server 128 may receive data from a GraphQL API Gateway 126. The GraphQL API Gateway 126 may receive data from financial institutions 124. The data received may include the GraphQL APIs and a unified GraphQL API.

Figure 2:
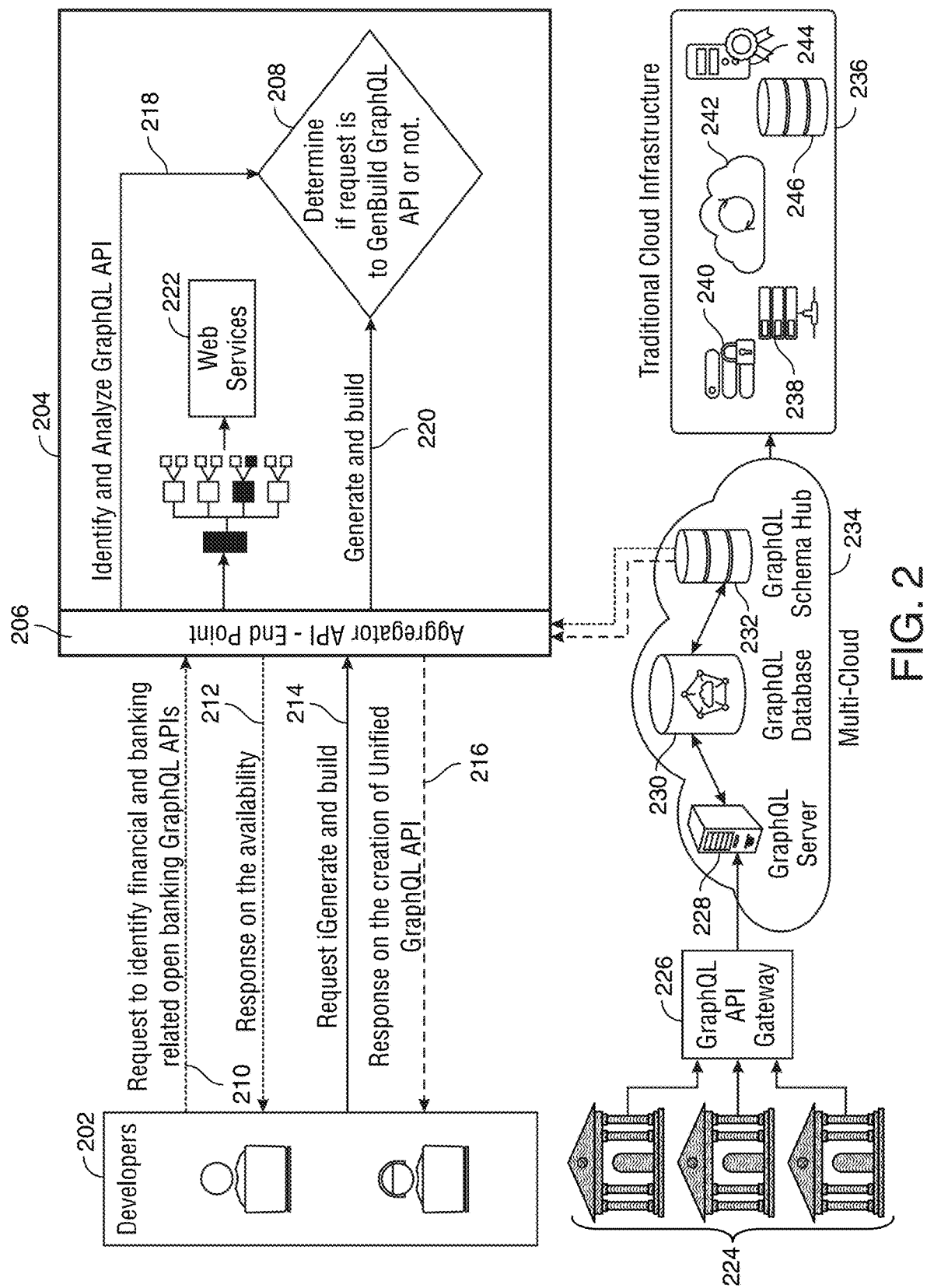
FIG. 2 shows a schematic diagram of the methods and systems in accordance with principles of the disclosure.

FIG. 2 shows another schematic diagram of the methods and systems in accordance with the principles of the disclosure.

Developers 202 may request 210, from Aggregator 204, to identify financial and banking related open banking GraphQL APIs. Aggregator 204 may include an Aggregator API-End Point 206 that may interface with the developers 202. Aggregator 204 may provide a response 212 on GraphQL API availability. Developers 202 may request 214 to iGenerate (instantly generate) and build a unified GraphQL API based on the GraphQL APIs. Aggregator 204 may provide response 216 on the creation of the unified GraphQL API.

Aggregator API-End Point 206 may receive data from a GraphQL Schema Hub 232 located within a multi-cloud 234. Multi-cloud 234 may send information to a Traditional Cloud Infrastructure 236. Traditional Cloud Infrastructure 236 may include traditional cloud architecture-data segments 238, data lock 240, data refresh 242, data security 244, and data storage 246.

The GraphQL Schema Hub 232 located within a multi-cloud 234 may be in communication with a GraphQL Database 230. The GraphQL Database 230 may be in communication with GraphQL Server 228. The GraphQL Server 228, GraphQL Database 230, and GraphQL Schema Hub 232 may be included within the multi-cloud 234.

The GraphQL Server 228 may receive information from GraphQL API Gateway 226. The GraphQL API Gateway 226 may receive information from financial institutions 224.

The Aggregator API-End Point 206 may identify and analyze a GraphQL APIs 218. The Aggregator API-End Point 206 may generate and build a Unified GraphQL API 220. The Aggregator API-End Point 206 may pass the GraphQL APIs and the unified GraphQL API through Web Services 222. Aggregator 204 may determine 208 whether the request is to GenBuild a unified GraphQL API. If so, the Aggregator may create the unified GraphQL API.

Figure 3A:
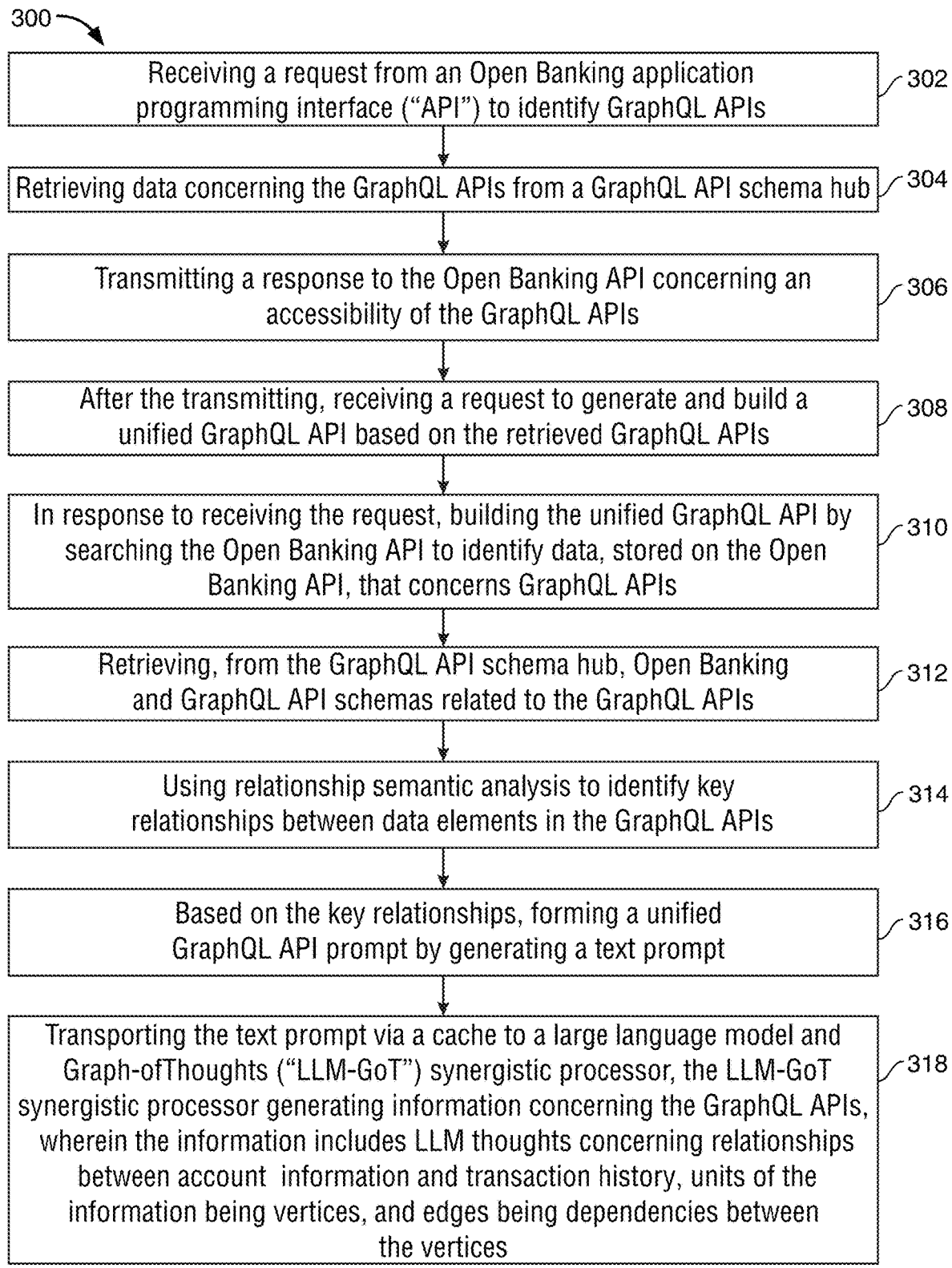
FIG. 3A shows an illustrative flow chart diagram in accordance with principles of the disclosure.

FIG. 3A shows an illustrative flow chart diagram 300 in accordance with principles of the disclosure.

The methods may include, and the systems may be configured to include the following step 302. Step 302 may be receiving a request from an Open Banking API to identify GraphQL APIs.

Step 304 may be retrieving data concerning the GraphQL APIs from a GraphQL API schema hub. Step 306 may be transmitting a response to the Open Banking API concerning an accessibility of the GraphQL APIs. Step 308 may be, after the transmitting, receiving a request to generate and build a unified GraphQL API based on the retrieved GraphQL APIs. Step 310 may be, in response to receiving the request, building the unified GraphQL API by searching the Open Banking API to identify data, stored on the Open Banking API, that concerns GraphQL APIs.

Step 312 may be retrieving, from the GraphQL API schema hub, Open Banking and GraphQL API schemas related to the GraphQL APIs. Step 314 may be using relationship semantic analysis to identify key relationships between data elements in the GraphQL APIs.

Step 316 may be, based on the key relationships, forming a unified GraphQL API prompt by generating a text prompt. Step 318 may be transporting the text prompt via a cache to an LLM-GoT synergistic processor, the LLM-GoT synergistic processor generating information concerning the GraphQL APIs, wherein the information concerning the GraphQL APIs includes LLM thoughts concerning relationships between account information and transaction history, units of the information concerning the GraphQL APIs being vertices, and edges being dependencies between the vertices.

Figure 3B:
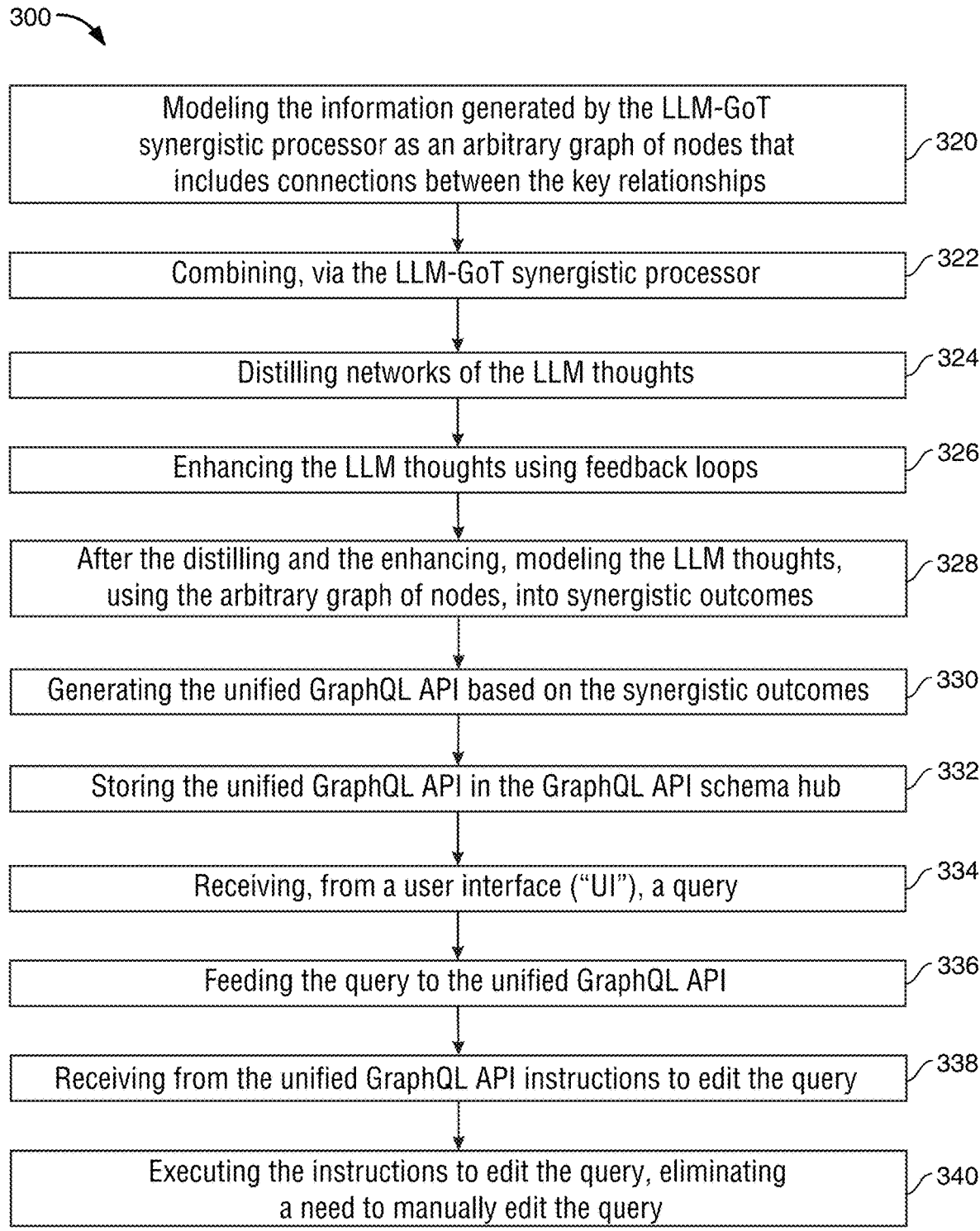
FIG. 3B shows a continuation of the illustrative flow chart diagram in FIG. 3A in accordance with principles of the disclosure.

FIG. 3B shows a continuation of the illustrative flow chart diagram 300 from FIG. 3A, in accordance with principles of the disclosure.

The methods may include, and the systems may be configured to include the following step 320. Step 320 may be modeling the information concerning the GraphQL APIs generated by the LLM-GOT synergistic processor as an arbitrary graph of nodes that includes connections between the key relationships. Step 322 may be combining, via the LLM-GOT synergistic processor.

Step 324 may be distilling networks of the LLM thoughts. Step 326 may be enhancing the LLM thoughts using feedback loops.

Step 328 may be, after the distilling and the enhancing, modeling the LLM thoughts, using the arbitrary graph of nodes, into synergistic outcomes. Step 330 may be generating the unified GraphQL API based on the synergistic outcomes.

Step 332 may be storing the unified GraphQL API in the GraphQL API schema hub. Step 334 may be receiving, from a UI, a query. Step 336 may be feeding the query to the unified GraphQL API. Step 338 may be receiving from the unified GraphQL API instructions to edit the query. Step 340 may be executing the instructions to edit the query, eliminating a need to manually edit the query.

Figure 4:
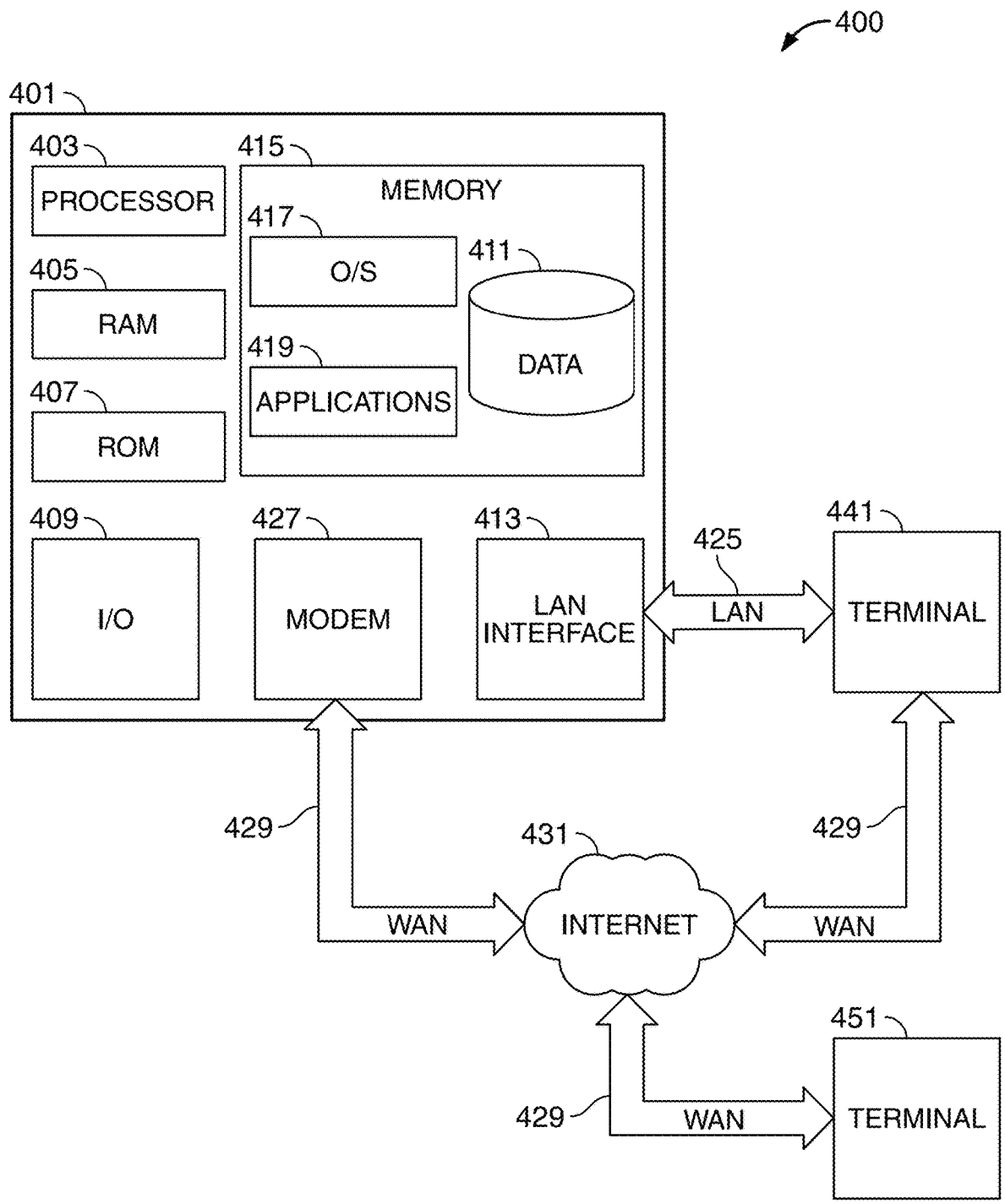
FIG. 4 shows an illustrative system in accordance with principles of the disclosure.

FIG. 4 shows an illustrative block diagram of system 400 that includes computer 401. Computer 401 may alternatively be referred to herein as an "engine," "server" or a "computing device." Computer 401 may be a workstation, desktop, laptop, tablet, smartphone, or any other suitable computing device. Elements of system 400, including computer 401, may be used to implement various aspects of the systems and methods disclosed herein. Each of the systems, methods and algorithms illustrated below may include some or all the elements and system of system 400.

Computer 401 may have a processor 403 for controlling the operation of the device and its associated components, and may include RAM 405, ROM 407, input/output ("I/O") 409, and a non-transitory or non-volatile memory 415. Machine-readable memory may be configured to store information in machine-readable data structures. The processor 403 may also execute all software running on the computer. Other components commonly used for computers, such as EEPROM or Flash memory or any other suitable components, may also be part of the computer 401.

Memory 415 may be comprised of any suitable permanent storage technology—e.g., a hard drive. Memory 415 may store software including the operating system 417 and application program(s) 419 along with any data 411 needed for the operation of the system 400. Memory 415 may also store videos, text, and/or audio assistance files. The data stored in memory 415 may also be stored in cache memory, or any other suitable memory.

I/O module 409 may include connectivity to a microphone, keyboard, touch screen, mouse, and/or stylus through which input may be provided into computer 401. The input may include input relating to cursor movement. The input/output module may also include one or more speakers for providing audio output and a video display device for providing textual, audio, audiovisual, and/or graphical output. The input and output may be related to computer application functionality.

System 400 may be connected to other systems via a local area network ("LAN") interface 413. System 400 may operate in a networked environment supporting connections to one or more remote computers, such as terminals 441 and 451. Terminals 441 and 451 may be personal computers or servers that include many or all of the elements described above relative to system 400. The network connections depicted in FIG. 4 include a LAN 425 and a wide area network ("WAN") 429 but may also include other networks. When used in a LAN networking environment, computer 401 is connected to LAN 425 through LAN interface 413 or an adapter. When used in a WAN networking environment, computer 401 may include a modem 427 or other means for establishing communications over WAN 429, such as Internet 431.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 419, which may be used by computer 401, may include computer executable instructions for invoking functionality related to communication, such as e-mail, Short Message Service ("SMS"), and voice input and speech recognition applications. Application program(s) 419 (which may be alternatively referred to herein as "plugins," "applications," or "apps") may include computer executable instructions for invoking functionality related to performing various tasks. Application program(s) 419 may utilize one or more algorithms that process received executable instructions, perform power management routines or other suitable tasks.

Application program(s) 419 may include computer executable instructions (alternatively referred to as "programs"). The computer executable instructions may be embodied in hardware or firmware (not shown). Computer 401 may execute the instructions embodied by the application program(s) 419 to perform various functions.

Application program(s) 419 may utilize the computer-executable instructions executed by a processor. Generally, programs include routines, programs, objects, components, data structures, etc., that perform tasks or implement abstract data types. A computing system may be operational with distributed computing environments where tasks are performed by remote processing devices that are linked through a communications network. In a distributed computing environment, a program may be in both local and remote computer storage media including memory storage devices. Computing systems may rely on a network of remote servers hosted on the Internet to store, manage, and process data (e.g., "cloud computing" and/or "fog computing").

Any information described above in connection with data 411, and any other suitable information, may be stored in memory 415.

The disclosure may be described in the context of computer-executable instructions, such as application(s) 419, being executed by a computer. Generally, programs include routines, programs, objects, components, data structures, etc., that perform tasks or implement data types. The disclosure may also be practiced in distributed computing environments where tasks are performed by remote processing devices that are linked through a communications network. In a distributed computing environment, programs may be in both local and remote computer storage media including memory storage devices. It should be noted that such programs may be considered for the purposes of this application, as engines with respect to the performance of the tasks to which the programs are assigned.

Computer 401 and/or terminals 441 and 451 may also include various other components, such as a battery, speaker, and/or antennas (not shown). Components of computer system 401 may be linked by a system bus, wirelessly or by other suitable interconnections. Components of computer system 401 may be present on one or more circuit boards. In some embodiments, the components may be integrated into a single chip. The chip may be silicon-based.

Terminal 441 and/or terminal 451 may be portable devices such as a laptop, cell phone, tablet, smartphone, or any other computing system for receiving, storing, transmitting and/or displaying relevant information. Terminal 441 and/or terminal 451 may be one or more user devices. Terminals 441 and 451 may be identical to system 400 or different. The differences may be related to hardware components and/or software components.

The disclosure may be operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 5:
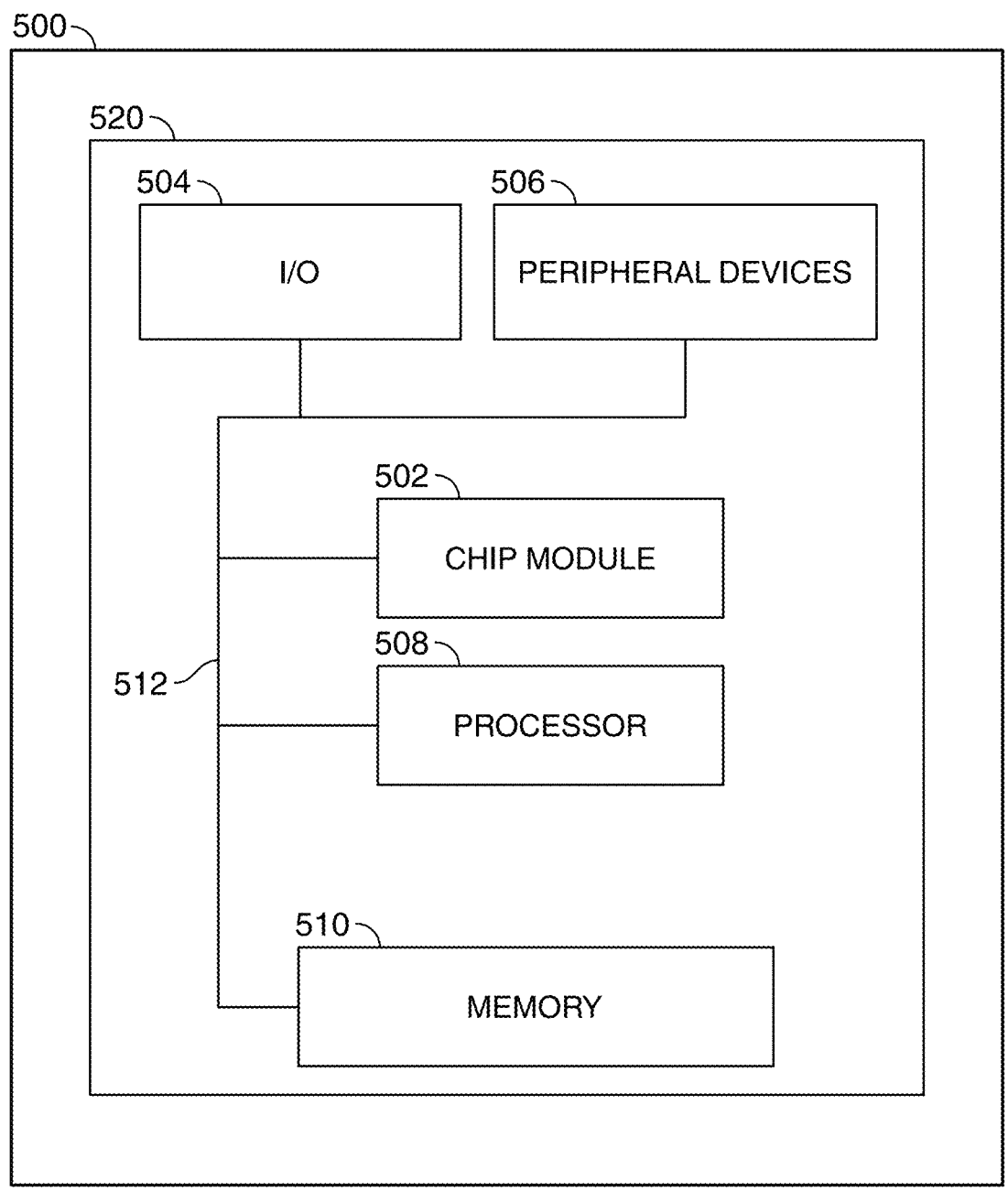
FIG. 5 shows an illustrative system in accordance with principles of the disclosure.

FIG. 5 shows illustrative system 500 that may be configured in accordance with the principles of the disclosure. System 500 may be a computing device. System 500 may include one or more features of the system shown in FIG. 5. System 500 may include chip module 502, which may include one or more integrated circuits, and which may include logic configured to perform any other suitable logical operations.

System 500 may include one or more of the following components: I/O circuitry 504, which may include a transmitter device and a receiver device and may interface with fiber optic cable, coaxial cable, telephone lines, wireless devices, PHY layer hardware, a keypad/display control device or any other suitable media or devices; peripheral devices 506, which may include counter timers, real-time timers, power-on reset generators or any other suitable peripheral devices; logical processing device 508, which may compute data structural information and structural parameters of the data; and machine-readable memory 510.

Machine-readable memory 510 may be configured to store in machine-readable data structures: machine executable instructions, (which may be alternatively referred to herein as "computer instructions" or "computer code"), applications such as applications 519, signals, and/or any other suitable information or data structures.

Components 502, 504, 506, 508 and 510 may be coupled together by a system bus or other interconnections 512 and may be present on one or more circuit boards such as circuit board 520. In some embodiments, the components may be integrated into a single chip. The chip may be silicon-based.

As will be appreciated by one of skill in the art, methods and systems shown or described herein may be embodied in whole or in part as a method, an apparatus or product by process. Accordingly, such systems may take the form of, and such methods may be performed by, an entirely hardware embodiment, an entirely software embodiment or an embodiment combining software, hardware and any other suitable approach or apparatus.

All ranges and parameters disclosed herein shall be understood to encompass any and all subranges subsumed therein, every number between the endpoints, and the endpoints. For example, a stated range of "1 to 10" should be considered to include any and all subranges between (and inclusive of) the minimum value of 1 and the maximum value of 10; that is, all subranges beginning with a minimum value of 1 or more (e.g., 1 to 6.1), and ending with a maximum value of 10 or less (e.g., 2.3 to 10.4, 3 to 8, 4 to 7), and finally to each number 1, 2, 3, 4, 5, 6, 7, 8, 10, and 10 contained within the range.

One of ordinary skill in the art will appreciate that the steps shown and described herein may be performed in other ways and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for synergistic use of an LLM-GOT for unified data access across GraphQL APIs via a single API are provided. Persons skilled in the art will appreciate that the present invention can be practiced by other than the described embodiments, which are presented for purposes of illustration rather than of limitation, and that the present disclosure is limited only by the claims that follow.

What is claimed is:

1. One or more non-transitory computer-readable media storing computer-executable instructions which, when executed by a processor on a computer system, perform a method for multi-cloud synergistic GraphQL generative artificial intelligence ("AI") that eliminates a need for manual editing of queries, the method comprising:
    receiving a request from an Open Banking application programming interface ("API") to identify GraphQL APIs;
    retrieving data concerning the GraphQL APIs from a GraphQL API schema hub;
    transmitting a response to the Open Banking API concerning an accessibility of the GraphQL APIs;
    after the transmitting, receiving a request to generate and build a unified GraphQL API based on the retrieved GraphQL APIs;
    in response to receiving the request, building the unified GraphQL API by:
        searching the Open Banking API to identify data, stored on the Open Banking API, that concerns GraphQL APIs;
        retrieving, from the GraphQL API schema hub, Open Banking and GraphQL API schemas related to the GraphQL APIs;
        using relationship semantic analysis to identify key relationships between data elements in the GraphQL APIs;
        based on the key relationships, forming a unified GraphQL API prompt by generating a text prompt;
        transporting the text prompt via a cache to a large language model and Graph-of-Thoughts ("LLM-GoT") synergistic processor, the LLM-GOT synergistic processor generating information concerning the GraphQL APIs, wherein the information concerning the GraphQL APIs generated by the LLM-GOT synergistic processor includes LLM thoughts concerning relationships between account information and transaction history, each unit of the information concerning the GraphQL APIs being a vertex in a GoT, and each edge in the GoT being a dependency between two vertices in the GoT;
        modeling the information concerning the GraphQL APIs generated by the LLM-GOT synergistic processor as an arbitrary graph of nodes that includes connections between the key relationships;
        combining, via the LLM-GoT synergistic processor:
            distilling networks of the LLM thoughts;
            enhancing the LLM thoughts using feedback loops; and
            after the distilling and the enhancing, modeling the LLM thoughts, using the arbitrary graph of nodes, into synergistic outcomes;
        generating the unified GraphQL API based on the synergistic outcomes; and
        storing the unified GraphQL API in the GraphQL API schema hub;
    receiving, from a user interface ("UI"), a query;
    feeding the query to the unified GraphQL API;
    receiving, from the unified GraphQL API, instructions to edit the query; and
    executing the instructions to edit the query, eliminating a need to manually edit the query.

2. The media of claim 1, wherein the GraphQL API schema hub is connected to a GraphQL database and a GraphQL server in a multi-cloud.

3. The media of claim 2, wherein the multi-cloud is connected to financial institutions via the GraphQL server, the GraphQL server being a GraphQL API gateway.

4. The media of claim 1, wherein the text prompt is in JavaScript Object Notation ("JSON") format.

5. The media of claim 1, wherein the key relationships include a relationship not explicitly defined in the GraphQL APIs.

6. The media of claim 1, wherein the key relationships include a relationship between a financial account number and a routing number.

7. The media of claim 1, wherein the GraphQL APIs is subjected to local traffic management.

8. The media of claim 1, wherein the unified GraphQL API includes a zip code.

9. The media of claim 1, wherein the unified GraphQL API replaces the GraphQL APIs.

10. The media of claim 1, wherein the eliminating a need to manually edit the query includes reducing a quantity of API developers required.

11. A method for performing multi-cloud synergistic GraphQL generative artificial intelligence ("AI") that eliminates a need for manual editing of queries, the method comprising:
    receiving a request from an Open Banking application programming interface ("API") to identify GraphQL APIs;
    retrieving data concerning the GraphQL APIs from a GraphQL API schema hub;
    transmitting a response to the Open Banking API concerning an accessibility of the GraphQL APIs;
    after the transmitting, receiving a request to generate and build a unified GraphQL API based on the retrieved GraphQL APIs;
    in response to receiving the request, building the unified GraphQL API by:
        searching the Open Banking API to identify data, stored on the Open Banking API, that concerns GraphQL APIs;
        retrieving, from the GraphQL API schema hub, Open Banking and GraphQL API schemas related to the GraphQL APIs;
        using relationship semantic analysis to identify key relationships between data elements in the GraphQL APIs;
        based on the key relationships, forming a unified GraphQL API prompt by generating a text prompt;
        transporting the text prompt via a cache to a large language model and Graph-of-Thoughts ("LLM-GoT") synergistic processor, the LLM-GOT synergistic processor generating information concerning the GraphQL APIs, wherein the information concerning the GraphQL APIs generated by the LLM-GOT synergistic processor includes LLM thoughts concerning relationships between account information and transaction history, each unit of the information concerning the GraphQL APIs being a vertex in a GoT, and each edge in the GoT being a dependency between two vertices in the GoT;
        modeling the information concerning the GraphQL APIs generated by the LLM-GOT synergistic processor as an arbitrary graph of nodes that includes connections between the key relationships;
        combining, via the LLM-GOT synergistic processor:

distilling networks of the LLM thoughts;

enhancing the LLM thoughts using feedback loops; and after the distilling and the enhancing, modeling the LLM thoughts, using the arbitrary graph of nodes, into synergistic outcomes;

generating the unified GraphQL API based on the synergistic outcomes; and storing the unified GraphQL API in the GraphQL API schema hub;

receiving, from a user interface ("UI"), a query;

feeding the query to the unified GraphQL API;

receiving, from the unified GraphQL API, instructions to edit the query; and executing the instructions to edit the query, eliminating a need to manually edit the query.

12. The method of claim 11, wherein the GraphQL API schema hub is connected to a GraphQL database and a GraphQL server in a multi-cloud.

13. The method of claim 12, wherein the multi-cloud is connected to financial institutions via the GraphQL server, the GraphQL server being a GraphQL API gateway.

14. The method of claim 11, wherein the text prompt is in JavaScript Object Notation ("JSON") format.

15. The method of claim 11, wherein the key relationships include a relationship not explicitly defined in the Graph APIs.

16. The method of claim 11, wherein the key relationships include a relationship between a financial account number and a routing number.

17. The method of claim 11, wherein the GraphQL APIs is subjected to local traffic management.

18. The method of claim 11, wherein the unified GraphQL API includes a zip code.

19. The method of claim 11, wherein the unified GraphQL API replaces the GraphQL APIs.

20. The method of claim 11, wherein the eliminating a need to manually edit the query includes reducing a quantity of API developers required.

* * * * *